United States Patent

Brenner et al.

[11] Patent Number: 6,070,839
[45] Date of Patent: Jun. 6, 2000

[54] STAND

[75] Inventors: Roland Brenner, Wallhausen; Dietmar Göhringer, Giengen; Bruno Stich; Gerhard Gaida, both of Aalen; Heinz Abranowsky, Giegen, all of Germany

[73] Assignee: Carl-Zeiss-Stiftung trading as Carl Zeiss, Germany

[21] Appl. No.: 09/045,485

[22] Filed: Mar. 20, 1998

[30] Foreign Application Priority Data

Mar. 20, 1997 [DE] Germany .............................. 197 11 572

[51] Int. Cl.[7] ....................................................... F16L 3/00
[52] U.S. Cl. ................................. 248/123.11; 248/292.11; 248/584
[58] Field of Search ...................... 248/123.11, 280.11, 248/292.11, 292.13, 584, 594; 359/384

[56] References Cited

U.S. PATENT DOCUMENTS

| | | | |
|---|---|---|---|
| 1,564,886 | 12/1925 | O'Neill | 248/584 X |
| 2,150,975 | 3/1939 | Hunsicker | 248/123.11 X |
| 2,398,211 | 4/1946 | DuPont | 248/584 X |
| 2,502,510 | 4/1950 | Daugert | 248/584 |
| 3,895,770 | 7/1975 | Yoshida et al. | 248/584 |
| 4,659,280 | 4/1987 | Akeel | 248/292.11 X |
| 5,253,832 | 10/1993 | Bolas et al. | |
| 5,609,316 | 3/1997 | Tigliev | 248/123.11 |
| 5,746,404 | 5/1998 | Merko | 248/123.11 |

FOREIGN PATENT DOCUMENTS

| | | |
|---|---|---|
| 221 571 A1 | 2/1984 | Germany . |
| 37 39 080 A1 | 11/1987 | Germany . |
| 481198 | 10/1936 | United Kingdom . |
| 2 074 337 | 4/1980 | United Kingdom . |

OTHER PUBLICATIONS

H. Hilpert, "Gewichtsausgleich an feinmechanischen Geräten," Heft Feb. 1965, pp. 61 thru 66.

*Primary Examiner*—Anita M. King
*Assistant Examiner*—Gwendolyn Baxter

[57] ABSTRACT

A stand for movable equipment has a first stand part and a second stand part that is movable relative to the first stand part and includes a pivot arm hinged to the first stand part and pivotable around a pivot axis. An energy storer provides weight equalization. The energy storer exerts a force on the pivot arm, by means of a deflecting element that is directed towards an abutment point on the first stand part. The pivot axis and the abutment point always define a vertical plane. The deflecting element is arranged on the second stand part.

16 Claims, 3 Drawing Sheets

STAND

BACKGROUND OF THE INVENTION

1. Field of the Invention

This invention relates to a stand, and more particularly, to a stand for movable equipment.

2. Description of Relevant Art

Such a stand is known, for example, from German Laid-Open Patent document DE 37 39 080 A1. This stand has a stand column and a pivot arm jointed to the stand column. To equalize the weight or torque acting on the pivot arm, a spring is provided that is attached at one end to the stand column and the other end, via a cord, to the pivot arm, the cord being reversed in its direction between the spring and the pivot arm. As a result, the spring exerts force on the pivot arm that is directed toward an abutment point, and the abutment point is displaced depending upon the respective position of the pivot arm.

The theory of this stand is also described in the article, "Weight Equalization in Precision Equipments" by H. Hilpert in Feingerätetechnik [Precision Equipment Technology], Vol. 2/1965 (see FIG. 7 on page 63 of this article). In the first paragraph of the left-hand column on page 63 of this article, it is explained that in the known stand, because of the finite curvature of the deflecting roller, i.e., because of the displacement of the abutment point when the pivot arm pivots, only an approximate weight equalization can be attained.

Such a stand is also known from East German Patent DD 221 571 A1, and is constructed according to the principles in the article by H. Hilpert. The abutment point in this stand also moves depending upon the respective position of the pivot arm because the deflecting element that deflects the cord connecting the end of the spring to the pivot arm is formed by an inclined surface with a finite curvature.

Furthermore, in both of these known stands, a separate constructional space is required for the arrangement of the deflecting element and the spring. As a result, the operability and possible pivoting region of the pivot arm may become restricted.

SUMMARY OF THE INVENTION

The object of the present invention is to provide a stand of the kind described, with the weight equalization improved as far as possible, and with an improved arrangement of the energy storer.

This object is attained by a stand having a first stand part and a second stand part that is movable relative to the first stand part. The second stand part has a pivot arm that is pivotable around a pivot axis and hinged to the first stand part and an energy storer that exerts a force directed toward an abutment point on the first stand part via a deflecting element. The pivot axis and the abutment point always define a vertical plane, and the deflecting element is arranged on the second stand part.

When the deflecting element is arranged on the second stand part and the pivot axis and the abutment point always define a vertical plane, an improved weight equalization is possible in relation to the point of action of the weight equalization force on the first, unpivoted, stand part, and a bulky deflecting arrangement that restricts the pivoting region is dispensed with.

In an embodiment in which the abutment point is arranged to be displaceable orthogonal to the pivot axis by means of a screw spindle, the optimum weight equalization can be restored by suitable displacement of the abutment point, even when there is a change in the torque acting on the pivot arm.

In a further, particularly compact embodiment, the energy storer includes a spring arranged on the pivot arm, the deflecting element being a deflecting roller arranged on the pivot arm.

When the spring is a compression spring, in particular a flattened wire spring, which at the pivot axis side is supported on the pivot arm, and whose end remote from the pivot axis acts on a flexible force-transmitting element passing about the deflecting roller to the abutment point, the possible fall path of the pivot arm in the case of a broken spring is limited. In addition, the flexible force-transmitting element that transmits the spring force provides good vibration damping properties.

In order to prevent bending or deflection of the spring from its longitudinal direction, thus providing further safety measures in case of a broken spring, the spring is guided on a tube that is displaceable in the pivot arm and whose end remote from the pivot axis is connected to the flexible force-transmitting element.

With a view to a spring that is guided precisely on the pivot arm and as free from play as possible, it is advantageous if the tube is guided by the deflecting roller and a pressing roller and also by means of a sliding bearing on the pivot arm.

When the tube has a friction-reducing coating on its spring side, that is, on its side facing the energy storing spring, the frictional forces of the spring on the tube can be minimized in the sense of a minimum resistance to movement of the pivot arm and minimum noise related to the friction of the spring on the tube.

In the embodiment in which the flexible force-transmitting element is constructed as a toothed belt that engages with teeth of the deflecting roller, slippage on the deflecting roller can be largely prevented. However, it is also possible to provide a chain wheel or a cord that wraps around a cord roller, instead of a toothed belt.

It is particularly advantageous in connection with a flexible force-transmitting element constructed as a toothed belt if the rotary mobility of the deflecting roller arranged on the pivot arm can be locked. The pivot arm can thereby be fixed in its position at any given time by rendering the deflecting roller stationary.

In a further embodiment, the pivot arm is constructed as a substantially closed hollow body that receives the spring in its interior. In this embodiment, the energy storer is largely protected from external influences. The pivot arm furthermore has a high torsional stiffness because it has only to permit passage of the flexible force-transmitting element through it in the region between the deflecting roller and the pivot axis.

BRIEF DESCRIPTION OF THE DRAWINGS

The invention is described hereinbelow with reference to preferred embodiments, taken together with the accompanying drawings, in which.

DETAILED DESCRIPTION OF PREFERRED EMBODIMENTS

Figure 1:
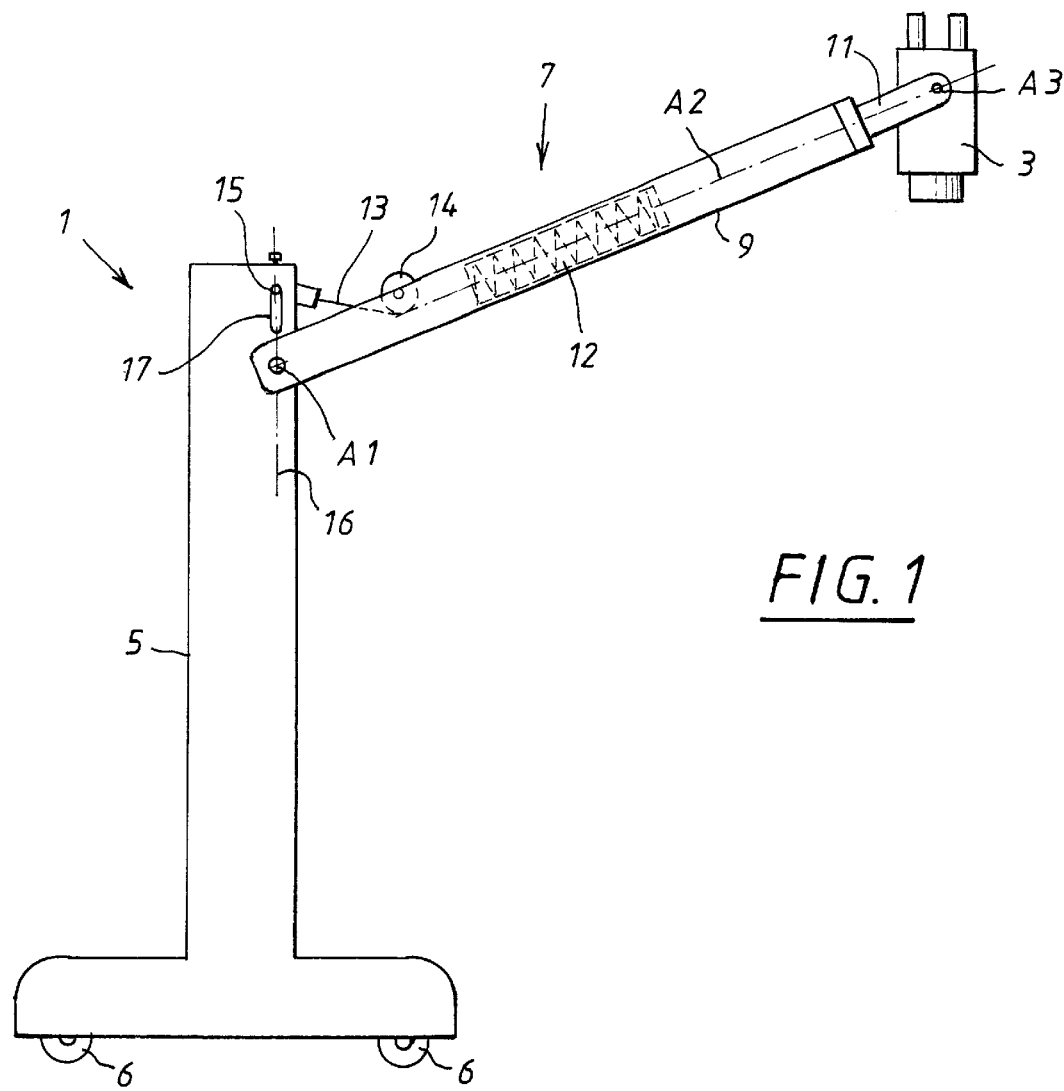
FIG. 1 shows a schematic illustration, in a side view, of an embodiment of the stand according to the invention.

A stand (1) according to the invention is shown in FIG. 1, and carries an operation microscope (3). The stand (1) has a base part (5) mounted on rollers (6) and a stand part (7) that is movable relative to the base part (5).

The stand part (7) includes a pivot arm (9) that is pivotably hinged to the base part (5) to pivot around a pivot axis (A1). The pivot axis (A1) is orthogonal to the plane of the drawing in FIG. 1, and also orthogonal to an equipment arm (11). The equipment arm (11) is rotatably supported by the pivot arm (9), to rotate around an axis (A2). An operation microscope (3) is arranged on the equipment arm (11), to be pivotable around an axis (A3) that is orthogonal to the plane of the drawing in FIG. 1.

The operation microscope (3) is always held by the stand in an unstable equilibrium (i.e., any point of the trajectory of the microscope is a stationary equilibrium. The microscope stands still as soon as the moving forces are removed. Only frictional or inertial forces but not gravity may resist movement of the microscope.) by means of the weight equalizing mechanism on the stand (1). This allows the microscope to be moved by the operator during an operation with as little force as possible.

For this purpose, an energy storer (12) is arranged within the pivot arm (9) (and therefore shown dashed in FIG. 1) and exerts force on the pivot arm (9) that is directed toward an abutment point (15) on the base part (5) by means of a flexible force-transmitting element (13) guided by a deflecting roller (14).

A vertical plane (16), shown dashed in FIG. 1 and orthogonal to the plane of the drawing in FIG. 1, is defined by the abutment point (15) and the pivot axis (A1). The vertical plane is independent of the respective pivoting position of the pivot arm (9). Thus, the abutment point (15) does not move while the pivot arm (9) is pivoted.

The abutment point (15) is displaceable, orthogonal to the pivot axis (A1), in a longitudinal slot (17) of the base part (5), in order to restore the desired unstable equilibrium when there is a change in the weight of the equipment (3) that is carried by the pivot arm (9).

Figure 2:
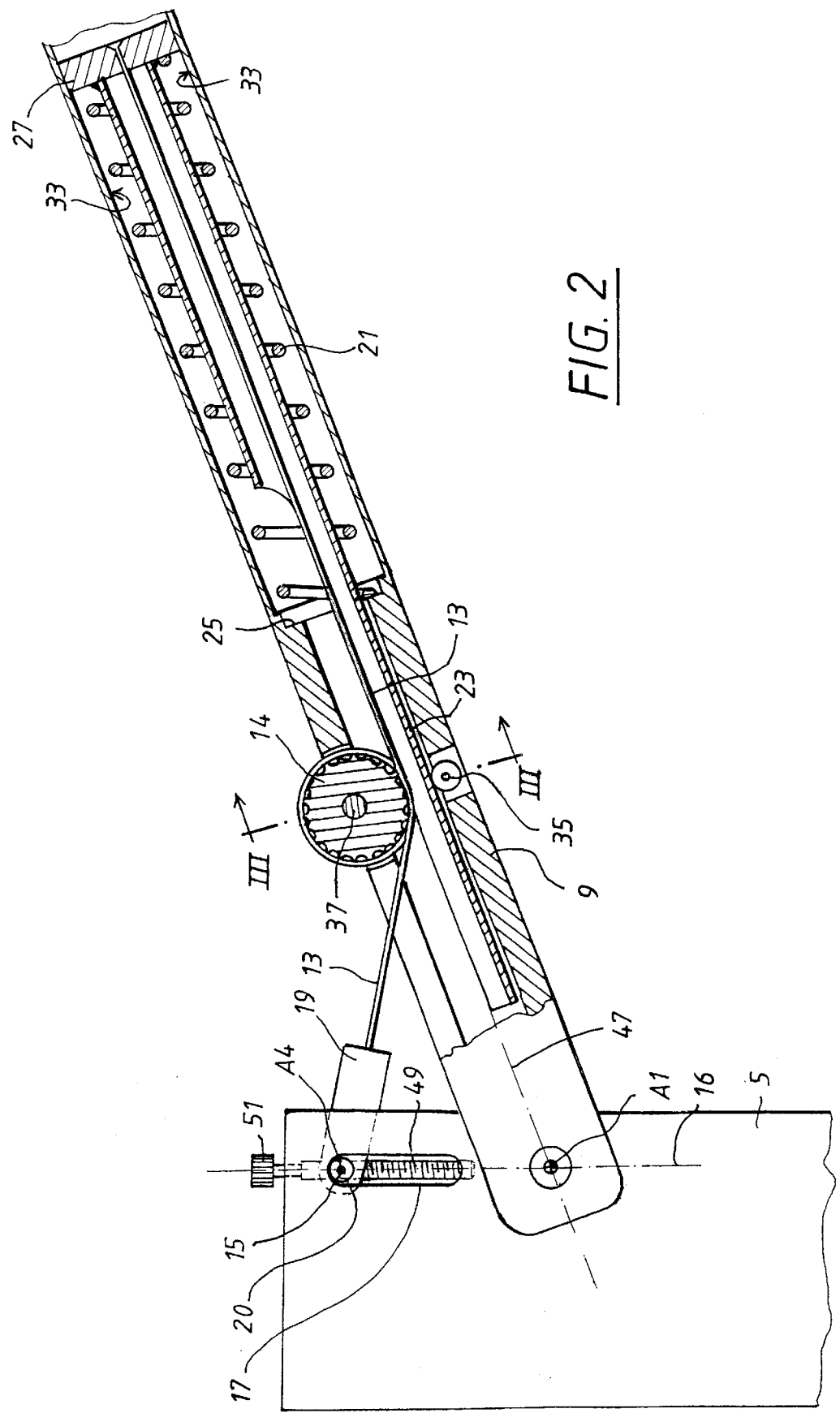
FIG. 2 shows a detail view of FIG. 1 in a partially sectional view.

FIG. 2 shows the position of the abutment point (15) in detail, and a sectional view of the energy storer (12) arranged in the pivot arm (9).

The flexible force-transmitting element (13) has a joint piece (19) on the side toward the base part (5) that is hinged about a joint axis (A4) parallel to the pivot axis (A1). The abutment point (15) thus lies at the point of intersection of the pivot axis (A4) and the tangent to the portion of the flexible force-transmitting element (13) between the joint piece (19) and the deflecting roller (14).

The energy storer (12) includes a flattened wire spring (21) received in the interior of the pivot arm (9) that is constructed as a hollow body. The flattened wire spring (21) is guided on a tube (23), movable in the pivot arm (9), and is supported at its end nearer the pivot axis (A1) on an annular shoulder (25) within the pivot arm (9), and at its other end on a flange (27) of the tube (23). Furthermore, the flexible force-transmitting element, constructed as a toothed belt (13), is fastened to the flange (27), and is deflected into its direction toward the abutment point (15) by the deflecting roller (14).

Since the shaft pin (20) is arranged on the runner of a vertically aligned screw spindle (49), the abutment point (15) can be displaced orthogonally of the pivot axis (A1) and within the vertical plane (16), by means of a spindle displacement screw (51) to restore the desired unstable equilibrium even when there is a change in the weight of the operation microscope (3).

A stand which functionally corresponds to the stand with weight equalizing mechanism as shown in FIG. 7 of the article by H. Hilpert is embodied by the arrangement shown according to the invention, of the compression spring (21), toothed belt (13), abutment point (15) and pivot axis (A1). Herein, the distances between the pivot axis (A1) and the abutment point (15), and also between the pivot axis (A1) and the deflecting roller (14), are selected so that the condition (22) in the article by H. Hilpert is fulfilled. This sets a precondition that the point of action of the masses that exert a torque on the pivot arm (9) about the pivot axis (A1) lies on a tangent (47) to the deflecting roller (14) that intersects the pivot axis (A1), or can be displaced into this tangent (47) by the displacement devices known for example from European Patent EP 433 426.

The tube (23) carrying the flattened wire spring (21) is guided without play, by means of its flange (27), by a sliding bearing (33) formed on the inner wall of the pivot arm (9) and by the deflecting roller (14) and a pressing roller (35).

Figure 3:
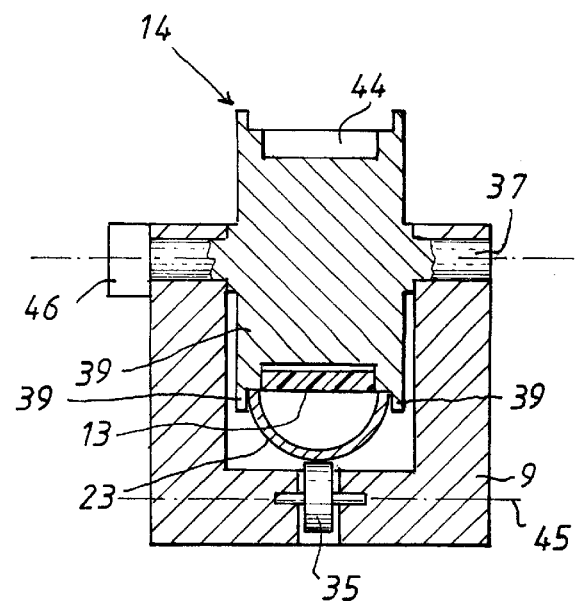
FIG. 3 shows a sectional view along the line III—III of FIG. 2.

This guiding of the tube (23) on the pivot axis side is shown in FIG. 3 in a sectional view along the section line denoted by the arrows III—III. The deflecting roller (14) is mounted on the pivot arm (9), is rotatable about an axis (37) parallel to the pivot axis (A1), and has two flanges (39) that receive the tube (23) between them. The tube (23) is semi-cylindrical in the region of the deflecting roller (14). A pressing roller (35) arranged to be rotatable around a rotation axis (45) parallel to the rotation axis (37) presses the tube (23) against the deflecting roller (14).

A locking element (46) that can be operated from outside the pivot arm (9), is installed on the rotation axis (37) and when operated prevents the deflecting roller (14) from rotating around the rotation axis (37). Because of the toothed belt (13) that meshes with teeth (44) of the deflecting roller (14), the position of the pivot arm (9) at any given time can be fixed by means of the locking element (46).

Figure 4:
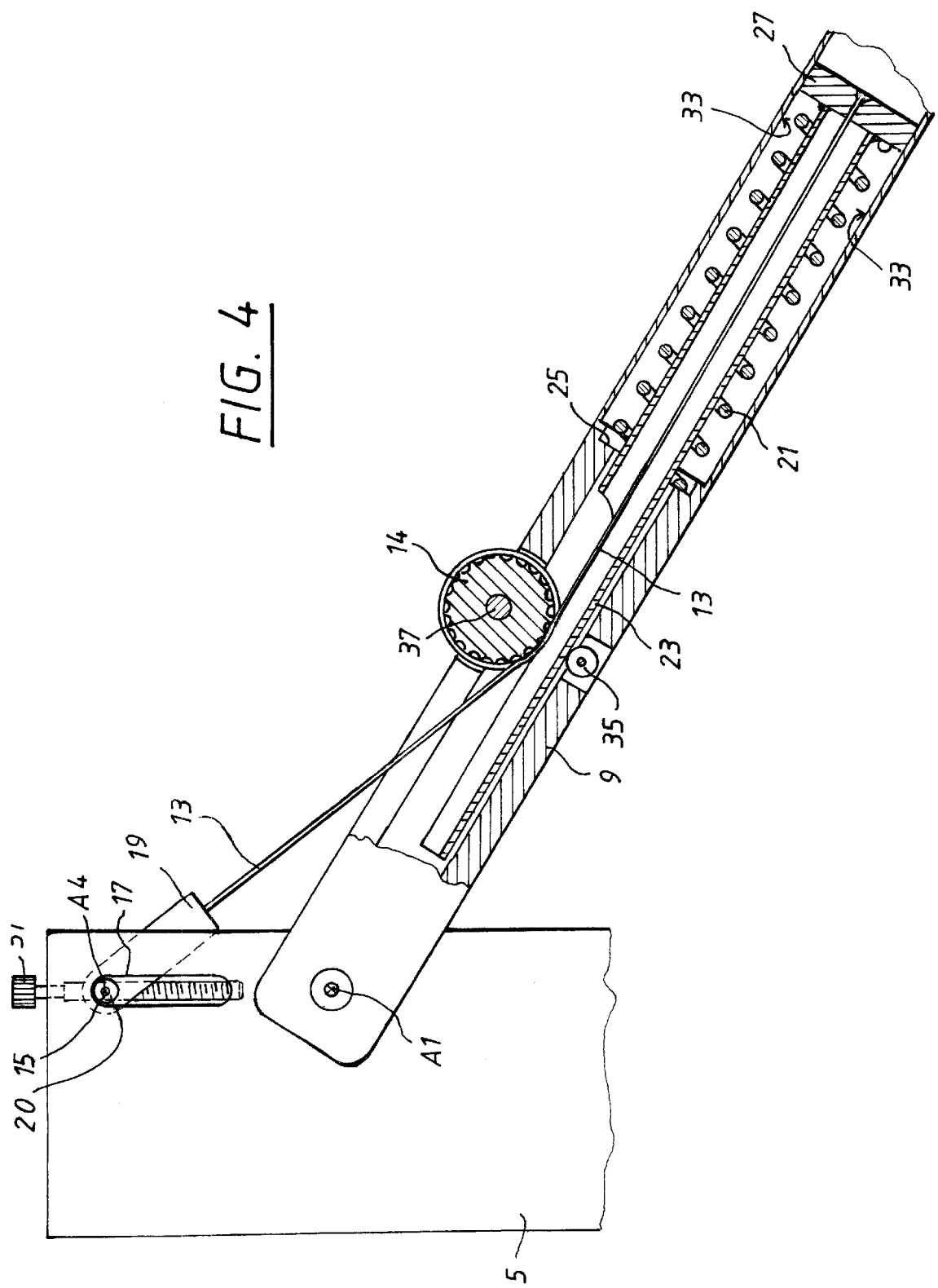
FIG. 4 shows a detail view corresponding to FIG. 2, in a different position of the pivot arm.

FIG. 4 shows the pivot arm (9) together with a portion of the base part (5) in a different pivoted position from that shown in FIG. 2.

We claim:

1. A stand (1) for movable equipment (3), comprising:
    a first stand part (5),
    a second stand part (7) that is movable relative to said first stand part (5), having a pivot arm (9) that is pivotable around a pivot axis (A1) and pivotably hinged to said first stand part (5), and an energy storer (12) that exerts a force directed toward an abutment point (15) on said fist stand part (5), via a deflecting element (14),
    said pivot axis (A1) and said abutment point (15) always lying on a vertical plane, and said reflecting element (14) being arranged on said second stand part (7),
    and a screw spindle (49) that displaces said abutment point (15) orthogonally of said pivot axis (A1) to change the direction of said force directed toward said abutment point (15).

2. The stand (1) according to claim 1, in which a compression spring (21) having an end towards said pivot axis (A1) is supported on said pivot arm (9) and having another end remote from said pivot axis that acts on a flexible force transmitting element (13) is guided by said deflecting element (14) to said abutment point (15).

3. The stand (1) according to claim 2, in which said spring (21) comprises a flattened wire spring (21).

4. The stand (1) according to claim 2, further comprising a tube (23) that guides said spring (21), is displaceable along said pivot arm (9), and has an end remote from said pivot axis (A1) connected to said flexible force transmitting element (13).

5. The stand (1) according to claim 4, in which said tube (23) has a friction-reducing coating on a side of said tube (23) towards said spring (21).

6. The stand (1) according to claim 2, in which said flexible force-transmitting element (13) comprises a toothed belt (13) that meshes with teeth (44) on said deflecting roller (14).

7. The stand (1) according to claim 6, further comprising a lock that prevents said deflecting roller (14) from rotating.

8. A stand (1) for movable equipment (3), comprising:
a first stand part (5),
a second stand part (7) that is movable relative to said first stand part (5), having a pivot arm (9) that is pivotable around a pivot axis (A1) and is pivotably hinged to said first stand part (5), and an energy storer (12) that exerts a force directed toward an abutment point (15) on said first stand part (5), via a deflecting element (14), in which:
said pivot axis (A1) and said abutment point (15) always lie on a vertical plane, and said reflecting element (14) is arranged on said second part (7),
said energy storer (12) includes a compression spring (21) arranged on said pivot arm (9),
said deflecting element (14) comprises a deflecting roller (14) arranged on said pivot arm (9), and
said compression spring (21) has an end towards said pivot axis (A1) that is supported on said pivot arm (9) and another end remote from said pivot axis that acts on a flexible force transmitting element (13) that is guided by said deflecting roller (14) to said abutment point (15).

9. The stand (1) according to claim 8, in which said pivot arm (9) comprises a substantially closed hollow body having an interior in which said spring (21) is received.

10. The stand (1) according to claim 8, further comprising a screw spindle (49) that displaces said abutment point (15) orthogonally of said pivot axis (A1).

11. The stand (1) according to claim 8, in which said energy storer (12) includes a flattened wire spring (21) arranged on said pivot arm (9).

12. The stand (1) according to claim 8, in which a tube (23) that guides said spring (21) is displaceable along said pivot arm (9), and has an end remote from said pivot axis (A1) connected to said flexible force transmitting element (13).

13. The stand (1) according to claim 12, in which said tube (23) has a friction reducing coating on a side of said tube (23) towards said spring (21).

14. The stand (1) according to claim 12, in which said flexible force-transmitting element (13) comprises a toothed belt (13) that meshes with teeth (44) on said deflecting roller (14).

15. The stand (1) according to claim 14, further comprising a lock that prevents said deflecting roller (14) from rotating.

16. A stand (1) for movable equipment (3), comprising:
a first stand part (5),
a second stand part (7) that is movable relative to said first stand part (5), having a pivot arm (9) that is pivotable around a pivot axis (Al) and is pivotably hinged to said first stand part (5), and an energy storer (12) that exerts a force directed toward an abutment point (15) on said first stand part (5), via a deflecting element (14), in which:
said pivot axis (A1) and said abutment point (15) always lie on a vertical plane, and said reflecting element (14) is arranged on said second stand part (7)
said energy storer (12) included a compression spring (21) arranged on said pivot arm (9),
said deflecting element (14) comprises a deflecting roller (14) arranged on said pivot arm (9)
said compression spring (21)comprises a flattened wire spring (21) having an end towards said pivot axis (A1) that is supported on said pivot arm (9) and another end remote from said pivot axis that acts on a flexible force transmitting element (13) that is guided by said deflecting roller (14) to said abutment point (15), a tube (23) that guides said compression spring (21) is displaceable along said pivot arm (9) and has an end remote from said pivot axis (Al) connected to said flexible force transmitting element (13), and
said tube (23) is guided without play by said deflecting element (14) and a press roller (35) and a slide bearing on said pivot arm (9).

* * * * *